United States Patent [19]

Wilson et al.

[11] Patent Number: 4,995,064

[45] Date of Patent: Feb. 19, 1991

[54] CONTINUOUSLY SWEEPING MULTIPLE-PASS IMAGE ACQUISITION SYSTEM FOR PERIPHERAL ANGIOGRAPHY

[75] Inventors: David L. Wilson, Trenton; Lawrence R. Tarbox, Belford, both of N.J.

[73] Assignee: Siemens Medical Systems, Inc., Iselin, N.J.

[21] Appl. No.: 471,317

[22] Filed: Jan. 29, 1990

[51] Int. Cl.$^5$ .......................... H05G 1/64; A61B 6/00; H04N 5/32

[52] U.S. Cl. .......................... 378/99; 378/4; 378/62; 358/111

[58] Field of Search .......................... 378/4, 62, 99, 85; 358/111

[56] References Cited

U.S. PATENT DOCUMENTS

| | | | |
|---|---|---|---|
| 4,204,225 | 5/1980 | Mistretta | 358/111 |
| 4,477,923 | 10/1984 | Baumann et al. | 378/95 |
| 4,633,494 | 12/1986 | Klausz | 378/205 |
| 4,723,261 | 2/1988 | Janssen et al. | 378/99 |
| 4,729,379 | 3/1988 | Ohe | 378/99 |
| 4,841,555 | 6/1989 | Doi et al. | 378/99 |
| 4,878,115 | 10/1989 | Elion | 358/111 |
| 4,881,124 | 11/1989 | Yokouchi et al. | 358/111 |
| 4,941,169 | 7/1990 | Kawai et al. | 378/99 |
| 4,943,987 | 7/1990 | Asahina et al. | 378/99 |

OTHER PUBLICATIONS

Proceedings of SPIE, papers presented Jan. 29-31, 1989, D. Wilson et al., vol. 1091, Medical Imaging III: Image Capture and Display (1989), pp. 356-362.

*Primary Examiner*—Janice A. Howell
*Assistant Examiner*—Kim-Kwok Chu
*Attorney, Agent, or Firm*—Lawrence C. Edelman

[57] ABSTRACT

In an X-ray imaging system, images of a moving bolus of contrast medium are acquired by the emission of X-ray radiation pulses through an object to be imaged while controlling the longitudinal movement of an X-ray imaging device of said system in a continuously sweeping manner over said object. For limiting motion induced blur in the acquired images to an acceptable level, X-ray exposure values are developed which limit the duration of the X-ray pulses so that they do not exceed a predetermined maximum duration. In a preferred embodiment mutliple passes of the imaging device are made over the object.

17 Claims, 3 Drawing Sheets

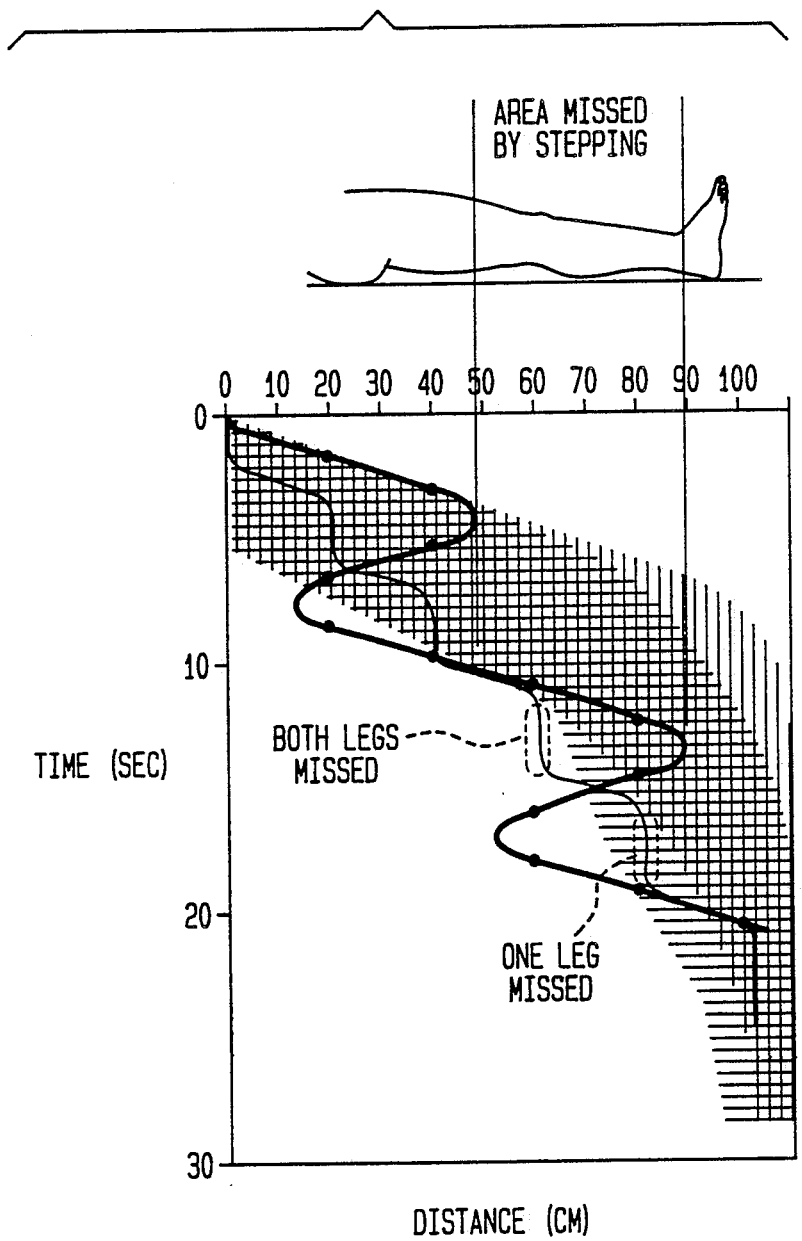

CONTINUOUSLY SWEEPING MULTIPLE-PASS IMAGE ACQUISITION SYSTEM FOR PERIPHERAL ANGIOGRAPHY

BACKGROUND OF THE INVENTION

1. Field of the Invention

The invention relates to an X-ray examination/diagnostic apparatus including an X-ray source and an X-ray image detection device which are mutually displacable with respect to an object to be examined, and more particularly, to a method and apparatus for controlling such mutual movement to comprise a continuous sweep during an X-ray examination of e.g., the vascular system of a patient.

2. Description of the Prior Art

X-ray examination apparatus for vascular imaging are now widely used and well known in the literature e.g. from U.S. Pat. No. 4,204,225 entitled REAL TIME DIGITAL X-RAY SUBTRACTION IMAGING. In such a device for digital subtraction imaging, X-ray images of a portion of a patient are recorded both before a contrast medium is injected into the patient as well as after injection of the contrast medium into the patient. Both sets of images are stored and digitized and then processed so that the images without the contrast medium (referred to hereinafter as mask images) are subtracted from the contrast-filled images (referred to hereinafter as contrast images) with a result that the contrast-filled vascular system becomes highly visible upon display of the processed images. During examination of, for example, parts of the body of the patient which do not fit within a single image field of the X-ray image detection device, problems are encountered because the images must be acquired from a plurality of different locations along the length of the patient. Often difficulties are experienced with respect to actually acquiring images of the bolus of the contrast medium as it passes through the vascular system.

Known systems for use in such examinations include programmable stepping tables or gantrys which provide the required relative movement between the X-ray examination device and the patient in order that the bolus of the contrast medium can be followed and imaged as it moves through the vascular system. In such a system, the bolus of contrast medium can be introduced by a single injection and multiple X-ray images can be acquired both before and after the injection. For example, first a series of mask images can be taken across the entire part of the body to be examined, after which the contrast medium is administered and a series of contrast images are formed at preprogrammed stepped locations which correspond to the locations where the mask images were formed and hopefully, image the contrast medium as it progresses through the body. However, the acquired images occasionally miss imaging of the contrast bolus and the patient must be subjected to re-takes of the examination. This is undesirable because a re-take of the examination requires the patient to be subjected to an additional dose of contrast medium, and its attendant risks. One source of difficulty comes from the fact that the system operator may mis-judge the flow rate of the contrast medium in the patient and select an incorrect stepping program. Another source of difficultly is that when imaging the legs, e.g., one leg may have a faster flow rate than the other.

Although a leg-sized film can be used for performing this type of examination, the size of the film makes its handling inconvenient and the image quality is degraded as compared to digital image acquisition techniques, due to uneven X-ray exposure. Additionally, it is desirable to utilize digital subtraction angiography in order to limit the amount of X-ray exposure to the patient.

It is an object of the invention to enable either digital angiography or digital subtraction angiography examinations for larger parts of the body, wherein the longitudinal dimension of the object being imaged is larger than the optical input of the X-ray image detection device and where a mutual longitudinal displacement of the X-ray source and X-ray image detection device with respect to the object being imaged is controlled in a manner which ensures to a high degree that the propagation of the contrast medium bolus flowing through the object can be properly imaged.

SUMMARY OF THE INVENTION

In accordance with the principles of the invention, the contrast images are acquired by controlling the longitudinal movement of the X-ray examination device so that multiple passes of the imaging system are made over the patient in a continuously sweeping manner. Due to the multiple passes of the X-ray device past the same positions of the body of the patient, the acquiring of the contrast images is spread out over time, thereby ensuring to a much higher degree the acquisition of properly filled contrast images.

In a preferred embodiment, the X-ray source and X-ray detection device are located on a moving gantry which progressively sweeps from one end of the body of the patient towards the other end while reversing its direction of travel several times during its journey.

There are several advantages of this technique over the preprogrammed stepped image acquisition technique. Firstly, as noted above, images obtained at any one position are spread out over time. This should increase the chance of imaging the contrast bolus in arteries having either fast or slow moving blood. Secondly, new information about the filling and emptying of arterial segments is obtained at some positions. Thirdly, perhaps a shorter contrast bolus (decreased injection time and consequently less contrast medium) may be used.

Additionally, there are mechanical advantages. Firstly, a sweeping movement doesn't require the time that a stepping movement requires to stop the gantry smoothly. Stepping requires a position feedback system in order to have adequate superposition of the mask and contrast images, whereas sweeping requires only accurate measurement and recordation of position and trigger data with respect to each acquired image. With sweeping, images can be acquired closer together, allowing the use of a smaller X-ray detector to cover the same area.

As one can understand, such continuous sweeping during image acquisition would normally result in severely blurred and therefore useless acquired images. In accordance with a further aspect of the invention, the power supplied to the X-ray source during each image acquisition is controlled so that the width of the energy pulse applied to the X-ray source is substantially maintained to be less than a predetermined maximum amount. The maximum amount is calculated to be short enough so that blurring of the contrast-filled images is maintained at an acceptable level.

In a preferred embodiment of the invention, a plurality of low-dosage X-ray exposures are made at predetermined different portions of the patient for determining estimates of the X-ray exposure control values which are to be used for acquiring each of the contrast images, which estimates are calculated to result in X-ray exposure pulse widths which are less than the forenoted maximum amount.

Other features and advantages of the invention will be apparent from the description of the preferred embodiment and from the claims.

For a fuller understanding of the present invention, reference should now be made to the following detailed description of the preferred embodiment of the invention and to the accompanying drawings.

BRIEF DESCRIPTION OF THE DRAWINGS

FIG. 8 illustrates a comparison of the effectiveness of an X-ray apparatus operated in accordance with the invention for acquiring images of a moving contrast bolus, as compared to a prior art technique having a stepped gantry.

DETAILED DESCRIPTION OF THE PREFERRED EMBODIMENT

Figure 1:
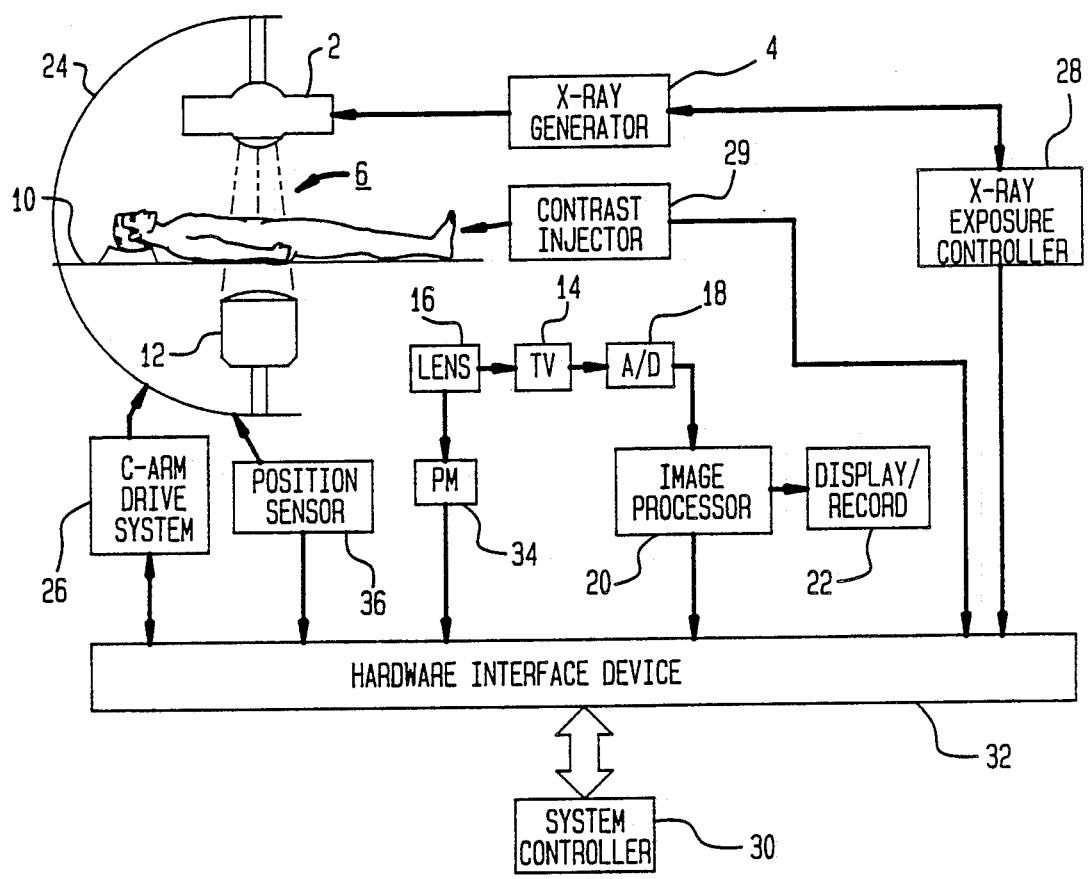
FIG. 1 illustrates in block diagram form an X-ray examination/diagnostic system including improvements in accordance with the present invention.

The X-ray examination apparatus shown in FIG. 1 comprises an X-ray tube 2 which is supplied by an X-ray power generator 4 for generating an X-ray beam 6. A patient 8 is supported on an X-ray table 10 at a position so that the generated X-rays 6 pass through patient 10 and onto an X-ray image intensifier tube 12 located on a side of the patient supporting table 10 which is remote from X-ray tube 2. As well known, the image intensifier tube 12 provides an optical output which is imaged into a television camera 14 by means of a lens system 16. Although the optical output from image intensifier tube 12 would normally be along an axis parallel to the axis of the X-ray beam input, a perpendicular path for the optical output is illustrated solely for the convenience of aiding drawing clarity. The image projected into television camera 14 is converted therein into a video signal. The video signal supplied from camera 14 is then digitized by an analog to digital (A/D) converter 18 and subsequently processed and stored in an image processor 20. A display/record device 22 is used to display and/or record the stored images as, e.g., the result of a digital subtraction examination.

For completing the conventional aspects of the system, a known type of C-arm gantry arrangement 24 is provided to move X-ray tube 2 and image intensifier tube 12 in a coordinated manner with respect to the patient support table 10. For this purpose, a high resolution C-arm drive system 26 is provided, as well as an X-ray exposure controller 28. Also provided is a contrast medium injector 29.

That portion of the X-ray examination apparatus including X-ray tube 2, image intensifier tube 12, television camera 14, C-arm gantry 24, patient supporting table 10, C-arm drive system 26 and image processor 20 are all conventional components well known in the art and may comprise, for example, the ANGIOSKOP D33 gantry system and the DIGITRON 3 X-ray image processing and control system, both available from Siemens Medical Systems, Inc., Iselin, NJ. Furthermore, the X-ray power generator 4 and X-ray exposure controller 28 are also known and commercially available components, available from, for example, the forenoted Siemens Medical Systems, Inc. under the respective device tradenames of POLYDOROS 100 and DIGIMATIC. In a preferred embodiment, image processor 20 includes the 1024-by-1024 matrix upgrade for improved image resolution. Contrast injector 29 may comprise a product available from Medrad Corporation under the trademark MARK V.

In accordance with the principles of the invention, X-ray exposure controller 28 pre-calculates X-ray exposure kV and mA values which are applied to the X-ray power generator 4 in a manner so that the X-ray pulse widths are substantially maintained within a predetermined range of relatively short pulse widths so as to reduce blurring of the acquired images.

In order to provide such control of the X-ray pulse width, in the preferred embodiment a system controller 30 is provided. System controller 30, comprising, for example, a personal computer, is adapted to receive and transmit control signals to and from the above-described components of the X-ray examination system via a hardware interface device 32. Hardware interface device 32 may provide voltage, current and/or timing modifications to the signals passing therethrough for allowing system controller 30 to monitor the operation of the X-ray examination system and individually control various parts thereof. The signal lines of the existing system components are either read and modified or simply read by system controller 30. By making all attachments at the signal line level, conventional components may be used without any significant modification. Hardware interface device 32 also switches signals such that the original routing is left intact when the system is not to be used for digital peripheral angiography.

In the preferred embodiment lens system 16 includes a beam splitting arrangement, known in the art, for directing a portion of the light responsive to the acquired X-ray image to a photomultiplier tube (PM) 34 which provides an output signal responsive to the amount of light acquired during each image acquisition. This signal will be used, as described in detail later on, by X-ray exposure controller 28 for terminating the X-ray pulse at precisely the proper time. A final component of the improved system is a position measuring device 36 for accurately indicating the relative position between C-arm 24 and the patient support table 10. For this purpose, a position measuring device 36 comprises, e.g., a component commercially available from Sony Corporation under their trademark DIGIRULER.

Figure 2:
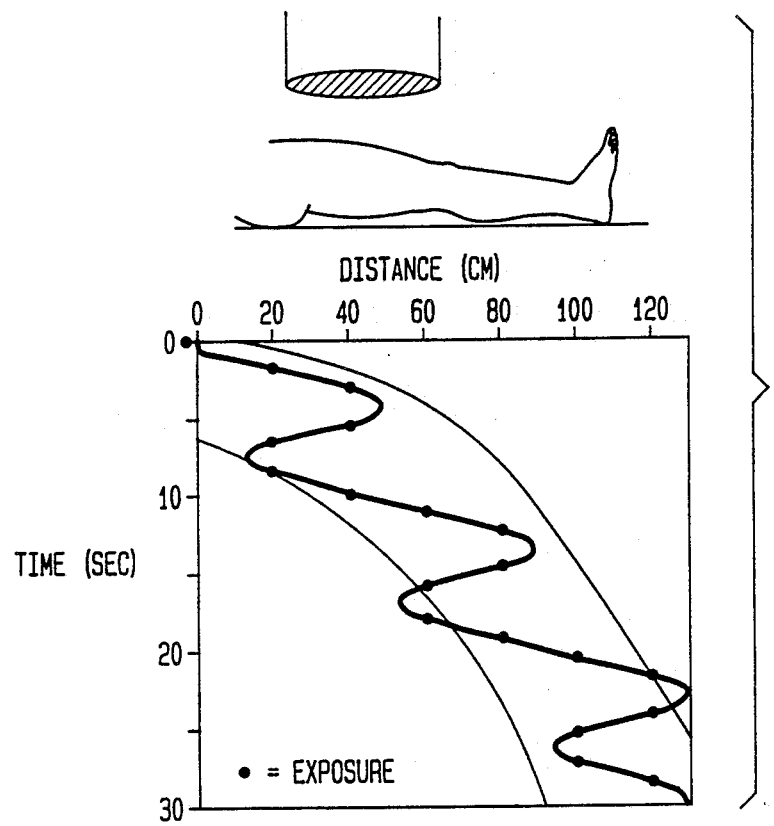
FIG. 2 illustrates an example of a programmed sweep path and image acquisition positions for the X-ray system shown in FIG. 1.

FIG. 2 illustrates an example of a sweep program for acquiring peripheral angiography images wherein the images are acquired during multiple passes of a continuously sweeping gantry. In FIG. 2, the x-axis indicates the position along the patient and the y-axis indicates time. Following injection of the contrast medium, C-arm 24 remains stationary over the lower abdomen of the patient acquiring images for a short duration. C-arm 24 then sweeps towards the feet, e.g., at 15 cm/s taking images at predetermined positions. In successive sweeps C-arm 24 travels progressively toward the feet, in the direction of the moving contrast bolus. Because the average velocity of the moving bolus down a human leg is typically approximately 6 cm/sec, the multi-pass sweeping technique has a good chance of imaging the bolus at any point along the leg. This sweep program was constructed from analysis of clinical data obtained on a long-leg film changer, and only shows the contrast run. The run for acquiring mask images may be performed before and/or after the contrast run, if digital subtraction angiography is to be accomplished. In accordance with an aspect of the invention, the mask image run is performed before the contrast run, in order.

As previously noted, the multi-pass, continuously sweeping method of image acquisition would normally lead to the problem of blurring of the acquired images in the direction of motion. The width of the blurring, $\omega$, obtained with a C-arm travelling at a velocity, $v$, and with a rectangular X-ray pulse of duration $t$ is represented by $$\omega = v \cdot t. \tag{1}$$

This rectangular point spread function of blurring results in a sinc function in the spatial frequency domain. If $\omega$ is set equal to the pixel size, the sinc function evaluated at $1/2\omega$, the Nyquist frequency, is reduced from its initial value by a factor of only 0.6. This should result in negligible blurring of the image because the analog video signal is filtered below the Nyquist rate in order to prevent aliasing. Thus, a conservative specification is that blurring should be less than one pixel in width.

Note that $\omega$ should be compared to the pixel size in the object plane which is obtained by dividing pixel size in the image plane by the magnification factor.

The calculation of some relevant quantities for two X-ray system configurations currently offered by Siemens Medical Systems, Inc. is as follows: Assuming a 33 cm image intensifier output is digitized with a 512-by-512 pixel matrix and an image magnification of 1.15, the pixel size in the object plane would be 0.56 mm. Assuming a C-arm speed of 15 cm/sec and a blur width of 1 pixel, the maximum X-ray pulse duration would be 3.7 ms. The same calculation for a 40 cm image intensifier, an 880-by-880 pixel matrix, and an image magnification of 1.15, gives a pixel size in the object plane of 0.39 mm and a maximum X-ray pulse duration of 2.6 ms.

Thus, in the present embodiment, a maximum pulse width of 3.7 ms (or 2.6 ms) is required to keeping image blurring at an acceptable level.

Image acquisitions during movement of C-arm 24 are accomplished by system controller 30 via monitoring of the output of position sensor 36 using rapid software polling and then providing a trigger signal to what is normally reserved as the EKG trigger signal input of the X-ray system, for triggering image acquisitions when preset target positions along the length of the patient are reached. System controller 30 also provides a signal having a preset sweeping waveform, such as shown in FIG. 2, to C-arm drive system 26 for accomplishing the required sweeping movements of C-arm 24.

In the preferred embodiment, the time to reverse direction was approximately 1.7 seconds with negligible vibration after the C-arm reached its constant velocity of 15 cm/sec.

As previously noted, the continuously sweeping C-arm places special requirements on the automatic exposure control system. The primary requirement is that X-ray pulses be made short enough to create negligible blurring, e.g., less than 3.7 ms in the preferred embodiment. The minimum X-ray pulse length for the POLYDOROS 100 X-ray power generator is 1 ms, which means that the exposure values for kV and/or mA must be adjusted to keep the pulse duration within a range of approximately 1 to 3 ms. Furthermore, if the C-arm travels at 15 cm/sec and images are acquired, e.g., every 8 cm, then the time between exposures is approximately 0.5 sec. The exposure control system must accommodate this. The POLYDOROS 100 generator allows kV to be adjusted almost instantaneously (less than 1 ms) and changes the mA in the time required for the filament of the X-ray tube temperature to change, less than 0.2 sec.

The POLYDOROS 100 X-ray generator and DIGIMATIC exposure control both have a photo-timed mode wherein the signal from photomultiplier tube 34 is representative of integrated light corresponding to a prescribed X-ray dose at the input of the image intensifier, and is used for terminating the X-ray pulse. Rather than integrate light from the entire field of view, a dominant or sensitive area for exposure regulation can be obtained by appropriate masking of the light from unwanted areas as known. In operation, it is necessary to initially calculate the exposure control values so as to maintain the X-ray pulse duration within the prescribed limits.

For this reason, in the preferred embodiment a low-dosage X-ray exposure (fluoroscopy) is used to initially estimate the absorption of the various positions of the body to be imaged. During this exposure a feedback control system autoregulates the exposure to provide approximately 20 $\mu$R/sec at the input of the image intensifier. Once the low-dose exposure system has regulated, the kV and mA values are used to uniquely determine the X-ray absorption of that position of the patient being imaged. These values are measured and converted to new values in order to obtain the proper kV and mA values needed for the subsequent digital X-ray exposure wherein the X-ray pulse width will be between 1 and 3 ms. In the preferred embodiment, proper selection of kV and mA values are subject to the following constraints: (1) approximately 200 $\mu$R/frame for each exposure; (2) kV must be between 40 and 150 kV; (3) mA must be between 10 and 1000 mA; (4) 82 kW is the maximum tube power rating; and (5) the kV value for optimal iodine contrast (63 kV) should be used if possible.

Figure 3:
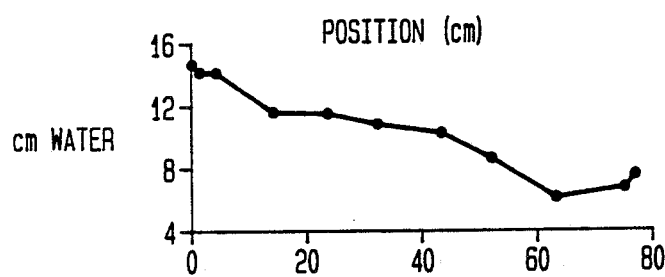
FIG. 3 illustrates an exposure requirement waveform useful for calculating appropriate exposure control values.

FIG. 3 illustrates the exposure requirements plotted versus the length of a typical patient, from the lower abdomen at 0 cm to the toes at 80 cm. Rather than report exposure points, the more general measure of equivalent water thickness in cm water is given. Equivalent water thickness is obtained by taking kV and mA values from the low-dosage acquisitions and converting them using a calibration curve obtained by plotting the obtained kV and mA values versus the height of water in a container placed in the X-ray field.

Figure 4:
FIGS. 4, 5 and 6 illustrate exemplar exposure control values determined from FIG. 3.
Figure 5:
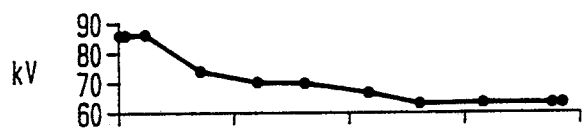
Figure 6:
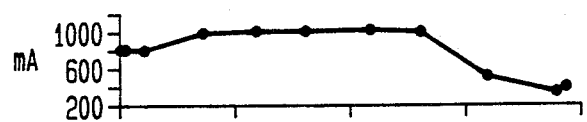

FIGS. 4, 5 and 6 illustrate the expected pulse width, as well as the kV and mA values, respectively, determined by exposure controller 28 in response to the requirements illustrated in FIG. 3.

Figure 7:
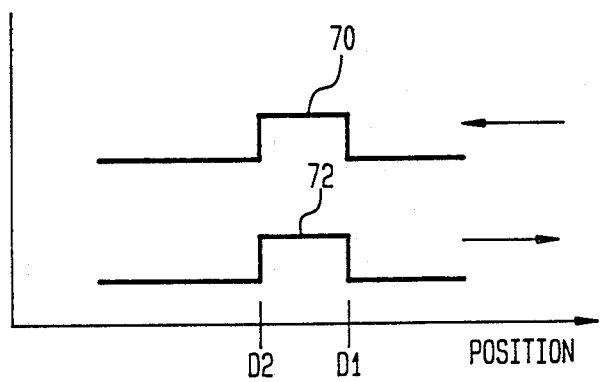
FIG. 7 illustrates waveforms useful for understanding the timing of the X-ray pulses.

In order to achieve minimum superpositioning error when combining the appropriate mask and contrast images in, e.g., a digital subtraction angiographic examination, it is necessary to control the X-ray trigger such that the X-ray pulses used to acquire the corresponding mask and contrast images at a predetermined imaging location, superimpose spatially at that location, with the end of one pulse coinciding with the beginning of the other and vice versa. This is accomplished by the technique shown in FIG. 7, wherein waveform 70 illustrates the X-ray pulse used for acquiring the mask image and waveform 72 illustrates the X-ray pulse used for acquiring the contrast image. In order to meet the above requirement, it is first necessary that the mask and contrast images be obtained during travel of the C-arm arrangement in respectively opposite directions. Then, waveform 70 is timed to substantially occur when the C-arm is travelling over the patient from position D1 to D2, while waveform 72 is controlled so that it is timed to occur when the C-arm arrangement is travelling over the patient from position D2 to D1.

Calculations and measurements from a humanoid phantom indicate that X-ray pulses can be made sufficiently short so that blurring is less than a pixel for almost all patients using allowable mA and kV values.

It is expected that excess blur width that might result from very large patients should not be a major concern because several factors reduce this problem. (1) The multiple-pass sweeping technique can be arranged so that the C-arm is always at rest when the initial images are acquired at the starting point, for example, over the abdomen. In this case, the X-ray pulse duration can be increased to achieve the required dose because no motion induced blurring can occur. Assuming that the second image will be approximately 15 cm from the starting position, the bulk of the lower abdomen may be passed before an image is taken with the moving C-arm. Thus, the X-ray absorption in the upper thigh can be considered rather than the absorption in the abdomen. (2) Arteries in the abdomen and thigh tend to be fairly large, greater than 5 mm in diameter. The blur widths described in the present embodiment would not pose a significant threat to diagnostic image quality. (3) The arteries in the lower abdomen and thigh are cranio-caudal, in the direction of C-arm travel. Recall that only those objects which lie traverse to the direction of travel of the C-arm are blurred. (4) It is possible to move the C-arm more slowly over the abdomen. (5) The requirement that blurring be less than one pixel wide may be overly conservative since the system analog filters probably filter the video signal much more than does the blurring due to motion. (6) Image processing techniques can be used to deblur the image.

FIG. 8 illustrates a comparison of the effectiveness of an X-ray apparatus operated in accordance with the invention for acquiring images of a moving contrast bolus, as compared to a prior art technique having a stepped gantry. The vertical shading indicates the time and position data of the moving contrast bolus in one leg of a patient and the horizontal shading indicates the time and position data of the moving contrast bolus in the other leg of the patient. Thus, an image acquired where the shaded areas coincide, i.e., the area having the cross-patch shading, would image the contrast bolus in both legs, while an image acquired where the shading is in one direction only, would image the contrast bolus in only one leg while missing the contrast bolus in the other leg. As can be seen, a stepped gantry having, for example, a program which acquires three images every 5 seconds and moves 20 cm closer to the toes each step of its longitudinal displacement, would completely miss acquiring images of the contrast bolus in both of the legs at the position corresponding to 60 cm. Furthermore, at the position corresponding to 80 cm, the contrast bolus will only be imaged in one leg and completely missed in the other leg. As clearly shown by the exposure points on the sweeping waveform, image data for the moving contrast bolus through both legs is acquired at each of the positions imaged by the stepped gantry technique. Clinical studies involving 25 patients have shown that the chances of missing an image of the contrast bolus in both legs is improved by a factor of two with the present invention as compared with the gantry stepping technique, and that the chances of missing an image of the contrast bolus in one leg is reduced by a factor of six with the present invention. Thus, with the present invention it is expected that the number of retakes of the diagnostic examination would be substantially reduced and thereby save the patient from receiving extra amounts of radiation and contrast media.

Thus, there has been shown and described a novel X-ray examination system using multiple-pass, rapid sweeping of the image acquisition devices, which fulfills all the objects and advantages sought therefor. Many changes, modifications, variations and other uses and applications of the invention will, however, be apparent to those skilled in the art after considering this specification and the accompanying drawings will disclose a preferred embodiment thereof. For example, instead of providing a moving C-arm for supporting the imaging devices, the C-arm or imaging devices may be stationary and the patient table may be repositionable for providing the required multi-pass sweeping. It is noted however that this would not be desirable when the object being examined comprises e.g., a relatively soft body, such as that of a human being, due to the undesirable forces the body would be subjected to during reversals of the direction of motion of the table. Furthermore, it is noted that this technique can be used for performing examinations other than those wherein digital subtraction techniques are utilized. Additionally, in some types of examinations, it may not be necessary to initially estimate the X-ray imaging requirements of the object in order that the X-ray pulse widths are less than the preset maximum amount for acceptable blur. All such changes, modifications, variations and other uses and applications which do not depart from the spirit and scope of the invention are deemed to be covered by the invention which is limited only by the claims which follow.

What we claim is:

1. A method for operating an X-ray examination device capable of acquiring images of an object under examination, comprising:
   introducing a bolus of contrast medium into said object, said object having a given dimension, e.g. length, through which said bolus is propagated which is greater than can be imaged by a single acquired image of said X-ray examination device;
   acquiring a series of images along the given dimension of said object so as to image said contrast bolus, said X-ray examination device being continuously displaced with respect to the given dimension of said object during acquisition of a substantial number of said series of images, said displacement comprising a smooth sweep motion over said object; and controlling the duration of the X-ray exposure provided by said X-ray examination device which is used for acquiring each of said acquired images so that said duration is substantially caused to be less than a preset duration which will result in said acquired images having a motion induced blur which is less than a predetermined amount.

2. The method of claim 1, wherein:
said displacement comprises a continuous sweep having preprogrammed multiple passes over portions of said object.

3. The method of claim 2, wherein:
said displacement comprises a sweep along the given dimension of said object at a speed of at least 2 times the estimated average propagating speed of the bolus of contrast medium within the object; and
said displacement has at least 2 reversals in its direction as said series of images are acquired.

4. The method of claim 1, wherein:
said X-ray exposure duration is controlled to have a maximum value of 3 ms when the speed of displacement of said X-ray examination device with respect to said object is within a range from 10 to 20 cm/sec.

5. The method of claim 1, wherein:
said displacement corresponds to a motion induced blur which is less than one picture element wide in each one of said acquired images.

6. The method of claim 1, wherein said controlling step comprises:
acquiring initial X-ray data along the length of said object which defines the X-ray exposure requirements for said object in accordance with various positions along its length; and
using said initial X-ray data to calculate X-ray exposure values to be used for acquiring said series of images, which X-ray exposure values are estimated to result in an X-ray exposure duration for each of said acquired images which is less than said preset duration.

7. The method of claim 6, wherein for performing a digital subtraction angiographic examination:
said step of acquiring initial X-ray data corresponds to a low-dosage fluoroscopic examination, the results of which are used for calculating the X-ray exposure values for the series of images intended to image said contrast bolus; and
said step acquiring a series of images to image said contrast bolus also acquires a second series of images along the length of said object at the same portions of said object that said first series of images were acquired, with correspondingly position ones of said first and second series of images being subtracted for displaying the result of said X-ray examination.

8. An X-ray examination apparatus, comprising:
an X-ray source for providing an imaging beam of X-ray radiation pulses;
an X-ray imaging device positioned for receiving said imaging beam and acquiring images in response thereto;

image processing means coupled to said X-ray imaging device for electronically processing and storing said acquired images;
position adjusting means for providing a spatial displacement between said X-ray imaging device and an object to be examined, said displacement being a smooth sweep in the direction of the given dimension of said object and occurring simultaneously with said X-ray imaging device acquiring a series of images along the given dimension of said object; and
means for calculating exposure control values which are applied to said X-ray source for controlling the emission of pulses of X-ray radiation emitted from said X-ray source, wherein said means determines said values in a manner so that said X-ray pulse widths are caused to substantially be less than a preset duration so as to provide a blur in the acquired images which is less than a predetermined amount.

9. The X-ray device of claim 8, wherein:
said position adjusting means causes said displacement to having a continuous sweeping motion with multiple passes over portion of said object.

10. The X-ray device of claim 8, wherein said means for calculating exposure control values comprises:
a first exposure control means for determining a plurality of estimates of X-ray exposure requirements for said object in accordance with various positions along the given dimension of said object; and
a second exposure control means responsive to the estimated exposure requirements developed from said first exposure control means for calculating said exposure control values which are applied for controlling the emission of said X-ray radiation pulses.

11. An X-ray examination device capable of acquiring digital subtraction images of an object under examination, comprising:
means for introducing a bolus of contrast medium into said object, said object having a longitudinal dimension, i.e. length, through which said bolus is propagated which is greater than can be imaged by a single acquired image of said X-ray examination device;
means for acquiring a first and second series of images along a length of said object;
means for causing said X-ray examination device to be continuously displaced with respect to the length of said object during acquisition of a substantial number of said second series of images in an effort to cause said second series of images to image said contrast bolus, said displacement comprising a continuous sweeping motion over said object;
means for controlling the duration of the X-ray exposure provided by said X-ray examination device which is used for acquiring each of said acquired images so that said duration is substantially caused to be less than a preset duration which will result in said second series of acquired images to have a motion induced blur which is less than a predetermined amount; and
means for subtracting correspondingly positioned ones of said first and second series of acquired images and displaying the result.

12. The X-ray device of claim 11, wherein:
said means for causing said X-ray examination device to be continuously displaced causes said displacement to have a continuous sweeping motion with multiple passes over portions of said object.

13. The X-ray device of claim 11, wherein:

said displacement comprises a sweep along the length of said object at a speed of at least 2 times the estimated average propagating speed of the bolus of contrast medium within the object; and said displacement has at least 2 reversals in its direction as said second series of images are acquired.

14. The x-ray device of claim 11, wherein:

said X-ray exposure duration is controlled to have a maximum value of 3 ms when the speed of displacement of said X-ray examination device with respect to said object is within a range from 10 to 20 cm/sec.

15. The X-ray device of claim 8, wherein said X-ray imaging device comprises:

image intensifier means for receiving radiation images and providing in response thereto corresponding optical images; and a television camera device optically coupled for receiving said optical images and providing in response thereto corresponding electronic images.

16. The X-ray device of claim 9, wherein:

said displacement comprises a sweep along the length of said object at a speed of at least 2 times the estimated average propagating speed of the bolus of contrast medium within the object; and said displacement has at least 2 reversals in its direction as said second series of images are acquired.

17. The X-ray device of claim 9, wherein:

said X-ray exposure duration is controlled to have a maximum value of 3 ms when the speed of displacement of said X-ray examination device with respect to said object is within a range from 10 to 20 cm/sec.

* * * * *